(12) United States Patent
Sehrawat

(10) Patent No.: US 12,627,489 B2
(45) Date of Patent: May 12, 2026

(54) POST-QUANTUM CONSTANT-TIME KEY ROTATION VERIFICATION

(71) Applicant: Circle Internet Group, Inc., Boston, MA (US)

(72) Inventor: Vipin Singh Sehrawat, Fremont, CA (US)

(73) Assignee: Circle Internet Group, Inc., Boston, MA (US)

( * ) Notice: Subject to any disclaimer, the term of this patent is extended or adjusted under 35 U.S.C. 154(b) by 54 days.

(21) Appl. No.: 18/236,587

(22) Filed: Aug. 22, 2023

(65) Prior Publication Data

US 2025/0070968 A1 Feb. 27, 2025

(51) Int. Cl.
*H04L 9/08* (2006.01)
*H04L 9/00* (2022.01)

(52) U.S. Cl.
CPC ............ *H04L 9/0891* (2013.01); *H04L 9/008* (2013.01)

(58) Field of Classification Search
CPC .............................. H04L 9/0891; H04L 9/008
See application file for complete search history.

(56) References Cited

U.S. PATENT DOCUMENTS

| | | | |
|---|---|---|---|
| 2015/0180661 A1 | 6/2015 | Fujii et al. | |
| 2015/0207630 A1* | 7/2015 | Shimoyama | ..... G06Q 20/40145 |
| | | | 713/186 |

| | | | |
|---|---|---|---|
| 2016/0204936 A1* | 7/2016 | Sakemi | ............... G06F 21/6227 |
| | | | 380/28 |
| 2021/0049296 A1 | 2/2021 | Blandin et al. | |
| 2022/0318431 A1 | 10/2022 | Sehrawat | |
| 2023/0388116 A1* | 11/2023 | Sehrawat | .................. H04L 9/16 |

FOREIGN PATENT DOCUMENTS

CN 112487460 A 3/2021

OTHER PUBLICATIONS

"Data encryption options," Web page, 1 page, retrieved from <cloud.google.com/storage/docs/encryption/> on Jul. 13, 2023.
"Protecting data by using client-side encryption," Web page, 1 page, retreived from <docs.aws.amazon.com/AmazonS3/latest/dev/UsingClientSideEncryption.html> on Jul. 13, 2023.

(Continued)

*Primary Examiner* — Vu V Tran
(74) *Attorney, Agent, or Firm* — Dinsmore & Shohl LLP

(57) ABSTRACT

Certain aspects of the disclosure provide a method for verifiable key rotation of an encryption key. The method includes generating a ciphertext by encrypting a plaintext with a homomorphic probabilistic encryption scheme based on a first key. The method further includes generating an updating token based on a difference between the homomorphic probabilistic encryption scheme based on a second key and generating a second ciphertext by encrypting the first ciphertext with the updating token. The method further includes validating the key rotation by selecting a set of second ciphertext blocks from the second ciphertext; reverting the set of second ciphertext blocks with the updating token to a set of third ciphertext blocks; and computing a Hamming distance between blocks of the set of second ciphertext blocks and the corresponding set of third ciphertext blocks.

14 Claims, 6 Drawing Sheets

(56) References Cited

OTHER PUBLICATIONS

Bai, Shi and Steven D. Galbraith. Lattice decoding attacks on binary LWE. Australasian Conference on Information Security and Privacy, 2014, pp. 322-337.

Banerjee, Abhishek and Chris Peikert. New and Improved Key—Homomorphic Pseudorandom Functions. Crypto, 2014, pp. 353-370.

Banerjee, Abhishek, et al. Pseudorandom functions and lattices. Eurocrypt, 2012, pp. 719-737.

Boneh, Dan et al. Key Homomorphic PRFs and Their Applications. Crypto, 2013, pp. 410-428.

Boudgoust, Katharina et al. On the hardness of module-LWE with binary secret. CT-RSA, 2021, pp. 503-526.

Brakerski, Zvika et al. Classical hardness of learning with errors. STOC, 2013, pp. 575-584.

Everspaugh, Adam et al. Key Rotation for Authenticated Encryption. Crypto, 2017, pp. 98-129.

Goldreich, Oded et al. How to construct random functions. Journal of the ACM, 1986, 33, pp. 792-807.

Goldwasser, Shafi and Silvio M. Micali. Probabilistic encryption & how to play mental poker keeping secret all partial information. STOC, 1982, pp. 365-377.

Protocol Labs. Filecoin: A Decentralized Storage Network, 2017, pp. 1-36.

Li, Cathy et al. Salsa Picante: a machine learning attack on LWE with binary secrets, 2023, pp. 1-15.

Micciancio, Daniele. On the hardness of learning with errors with binary secrets. Theory of Computing, 2018, 14, 13, pp. 1-17.

Micciancio, Daniele and Chris Peikert. Hardness of SIS and LWE with small parameters. Crypto, 2013, pp. 21-39.

Peikert, Chris. A decade of lattice cryptography. Foundations and Trends in Theoretical Computer Science, 2016, 10, 4, pp. 283-424.

Regev, Oded. On lattices, learning with errors, random linear codes, and cryptography. STOC, 2005, pp. 84-93.

Schacke, Kathrin. On the Kronecker Product, 2013, pp. 1-35.

Sehrawat, Vipin Singh and Yvo Desmedt. Bi-Homomorphic Lattice-Based PRFs and Unidirectional Updatable Encryption. Cans, 2019, 11829, pp. 3-23.

Williams, Sam et al. Arweave: A Protocol for Economically Sustainable Information Permanence. 2019, pp. 1-67.

Lehmann, Anja and Björn Tackmann. Updatable encryption with post-compromise security. Eurocrypt, 2018, pp. 685-716.

PCT International Search Report and Written Opinion of International Patent Application PCT/US2024/043296, mailed Jul. 7, 2025, 12 pages, International Searching Authority (US).

* cited by examiner

500

502

Generate a first ciphertext by encrypting a plaintext with a homomorphic probabilistic encryption scheme based on a first key

504

Generate an updating token based on a difference between the homomorphic probabilistic encryption scheme based on the first key and the homomorphic probabilistic encryption scheme based on a second key

506

Generate a second ciphertext by encrypting the first ciphertext with the updating token.

POST-QUANTUM CONSTANT-TIME KEY ROTATION VERIFICATION

BACKGROUND

Field

Aspects of the present disclosure relate to verifiable key rotation of an encryption key.

Description of Related Art

An encryption key is used to encrypt and/or decrypt data. Encryption keys may be generated with an algorithm to ensure it is unique, unpredictable, and properly encrypts/decrypts the data.

In symmetric encryption, the same encryption key is used to encrypt and decrypt data (e.g., plaintext). A sender of encrypted data (e.g., ciphertext) must share the symmetrical key with the receiver to allow the receiver to decrypt the ciphertext, revealing the plaintext. If the symmetrical key is compromised, then the ciphertext is also compromised because anyone with the symmetrical key may decrypt the ciphertext with the key, revealing the plaintext. Additionally, the key may be used to encrypt other plaintext, rendering the ciphertext untrustworthy.

In asymmetric encryption, two different, albeit related, encryption keys are used. A public key is distributed and a private key is kept secret. A sender encrypts the data with a public key and the receiver uses the corresponding secret private key to decrypt the encrypted data. The ciphertext remains secret even with a distributed public key because the encryption function is one-way such that only the receiver with the private key can decrypt the ciphertext. However, if the private key is compromised, the ciphertext may be decrypted and the plaintext revealed. Further, a private key may be used to sign verifiable messages. However, if the key is compromised, any signature is also compromised.

Generally, it is best practice to periodically update an encryption key, regardless of whether it is used for symmetric or asymmetric encryption, through key rotation whereby the current encryption key is replaced with a new encryption key. Key rotation prevents compromise of data, such as through key exhaustion. An encryption key is exhausted and thus exposed when it is used more times than it should be used because overuse of an encryption key can result in revealing information about the underlying plaintext or the secret values in the encryption key itself.

Furthermore, key rotation can be used to revoke old encryption keys, for example, that might have been compromised or to revoke data access, because once an encryption key has been replaced by a new encryption key, the older encryption key cannot access the data.

Accordingly, there is a need in the art for methods of key rotation for encryption key materials.

SUMMARY

Certain aspects provide a method for key rotation of an encryption key, comprising: generating a first ciphertext by encrypting a plaintext with a homomorphic probabilistic encryption scheme based on a first key; generating an updating token based on a difference between the homomorphic probabilistic encryption scheme based on the first key and the homomorphic probabilistic encryption scheme based on a second key; and generating a second ciphertext by encrypting the first ciphertext with the updating token.

Other aspects provide processing systems configured to perform the aforementioned methods as well as those described herein; non-transitory, computer-readable media comprising instructions that, when executed by a processor of a processing system, cause the processing system to perform the aforementioned methods as well as those described herein; a computer program product embodied on a computer-readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

DESCRIPTION OF THE DRAWINGS

The appended figures depict certain aspects and are therefore not to be considered limiting of the scope of this disclosure.

FIG. 5 depicts an example method for performing key rotation.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
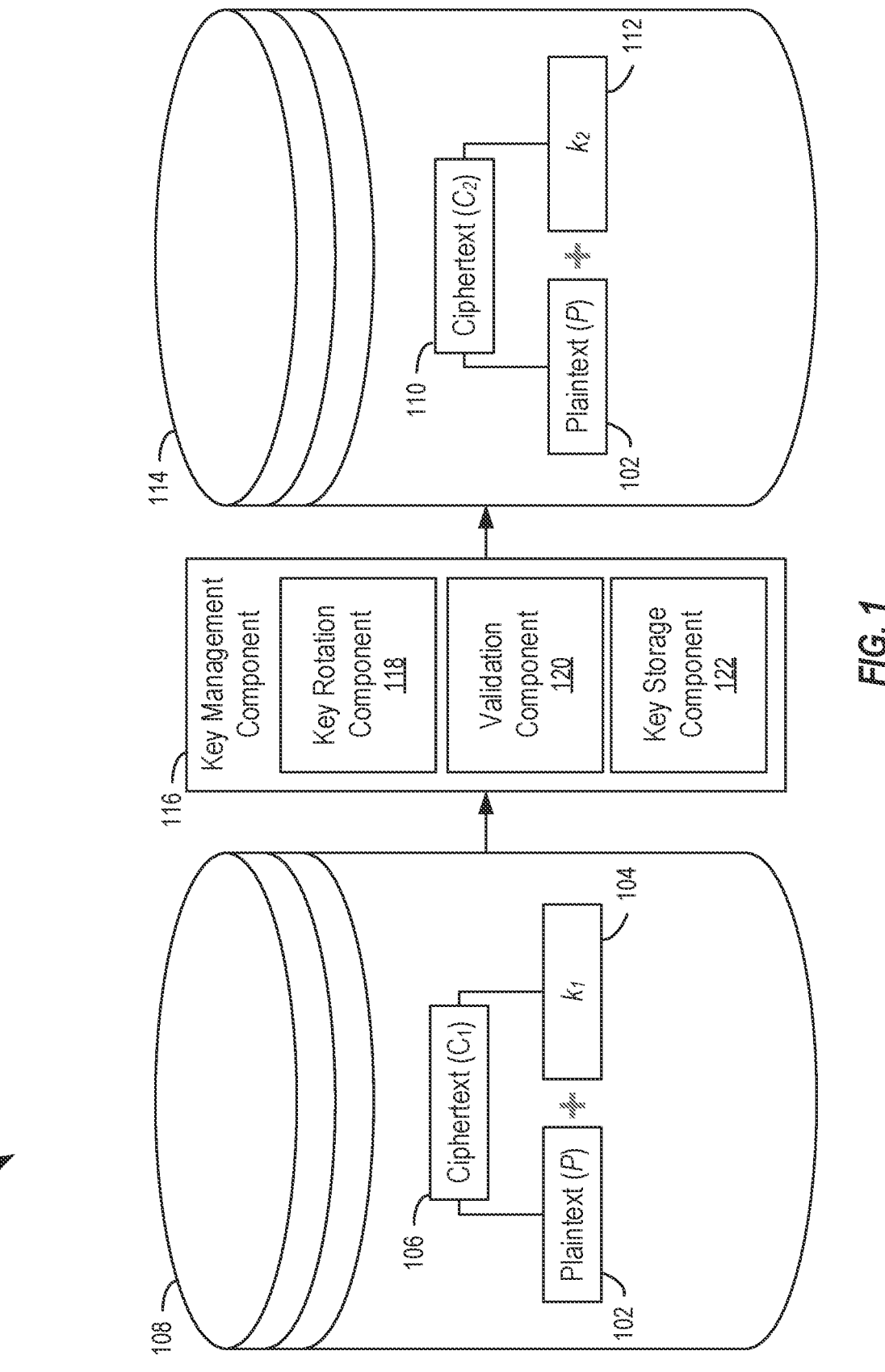
FIG. 1 depicts an example process flow for performing key rotation.

Aspects of the present disclosure provide apparatuses, methods, processing systems, and computer-readable mediums for performing computationally efficient, secure, and verifiable key rotation of an encryption key.

As described above, key rotation is the process of periodically exchanging the cryptographic key material (or encryption key) used to encrypt and protect data. By replacing an old key with a new key at regular intervals, the underlying data remains secure and protected, and any compromise of the old key is mitigated.

One method for key rotation is to decrypt the ciphertext and then re-encrypt the resulting plaintext with the new key. However, in symmetrical encryption, every time a key needs to be rotated, the new key must be shared with the receiver. As keys may need to be frequently rotated, the plaintext is also frequently exposed when it is decrypted. Additionally, it requires extensive computational resources (e.g., compute, memory, power, and in some cases network bandwidth) to decrypt and then re-encrypt large amounts of data regularly.

Another method for key rotation involves encapsulating an encryption key (e.g., a symmetric key or a private key) by encrypting the encryption key with an encapsulation key. The encapsulation key is then periodically rotated by decrypting the encryption of the encryption key and then re-encrypting the encryption key ("encapsulating it") with a new encapsulation key. Beneficially, this method avoids exposing the underlying data because it is not being decrypted and then re-encrypted. Additionally, this method is relatively efficient because the data being decrypted and re-encrypted extends to the encryption key, and not the potentially large amount of underlying data. However, the encryption key for the underlying data is not actually being rotated, rather the encapsulation key is being rotated. Thus, if the encryption key were compromised, for example, by exposure during key rotation or the encapsulation key being compromised, the underlying data is compromised.

Yet another method for key rotation uses a re-encryption or update token to securely update a ciphertext generated with a first key to a ciphertext generated with a second key. This method, called symmetric updatable encryption, supports full key rotation without requiring the ciphertext to be decrypted, revealing the underlying data. However, some methods of symmetric updatable encryption suffer from relatively weak confidentiality goals and may not provide post-compromise security (i.e., security after a key is compromised). One proposed method to provide post-compromise security is based on the Decisional Diffie-Hellman assumption; however, this assumption, and thus this method, are vulnerable to quantum computers. Additionally, symmetric updatable encryption methods are bidirectional, in that the update token used to update the ciphertext to a new key can also be used to revert to the old ciphertext, decryptable by the old key, so compromise is possible despite the updated ciphertext. Furthermore, symmetric updatable encryption methods do not provide a mechanism for validating the re-encryption of the ciphertext generated with a second key. Thus, in order to ensure the updated ciphertext is a valid encryption of the underlying plaintext, ensuring integrity, the update ciphertext would be decrypted and then re-encrypted, resulting in potential exposure of the data, and requiring extensive computational resources for the decryption and re-encryption.

Furthermore, many encryption techniques rely on the difficulty of "cracking" the encryption scheme by conventional computers by guessing the encryption key. For example, conventional computers may require extensive computational resources (e.g., compute, memory, power, etc.) and time to find the right key. However, quantum computers may be able to crack encryption schemes by performing calculations needed to find the right key exponentially faster, thus reducing the security of such encryption schemes.

Aspects described herein provide a technical solution to the aforementioned technical shortcomings (problems) by providing systems and methods for a homomorphic probabilistic encryption scheme for performing verifiable encryption key rotation. The homomorphic probabilistic encryption scheme is used to encrypt data and then periodically update the encryption to be based on a new encryption key with an updating token. Thus, the data remains encrypted, but the key used for encrypting the data is rotated regularly. Beneficially, by using the updating token described herein, the updated encryption is verifiable to ensure the integrity of the underlying data.

The key-homomorphic probabilistic encryption scheme described herein is based on a binary learning with errors problem to build a secure post-quantum cryptosystem, meaning the encryption scheme is resistant to compromise by a quantum computer. In one example, a key is obtained from a key-homomorphic pseudorandom function family by sampling a secret matrix of the key-homomorphic pseudorandom function family from a binary distribution with a lower norm, such that a Hamming weight, or the number of non-zeros, of the secret matrix is below a fixed threshold. By using this secret matrix, the homomorphic pseudorandom function family outputs a randomized linear combination of the output of another randomized linear function. Thus, for example, performing updatable encryption on a plaintext with different keys selected from the secret matrix yields two outputs, or two ciphertexts, for which the Hamming distance may be predicted based on the Hamming distance between the two keys. Beneficially, then, a data owner may validate the two ciphertexts encrypting the same plaintext by comparing the Hamming distance between the two ciphertexts and the Hamming distance between the two keys because the two ciphertexts are correlated via key-homomorphism of the underlying key-homomorphic pseudorandom function family. Therefore, an encryption key may be rotated using the key-homomorphic probabilistic encryption scheme presented herein, and the updated encryption is validated by determining the Hamming distance between the two ciphertexts, without decrypting the updated encryption.

Thus, aspects described herein provide many benefits compared to the conventional schemes described above. Specifically, aspects described herein provide key rotation by using the update token to update the encryption to be based on a new key. Beneficially, the old key is replaced and the new key may be used to decrypt the encrypted data. Thus, the old key, which may be compromised, is revoked and cannot decrypt the encrypted data. Further, by using the update token, the ciphertext may be efficiently re-encrypted with the new key without needing to both decrypt the encryption and then re-encrypt with the new key. Also, by using the key-homomorphic probabilistic encryption scheme described herein, the encryption is not vulnerable to quantum computers, due to the reliance on the learning with errors problem, as described further below. Furthermore, as described herein, the updated ciphertext may be verified as a valid re-encryption of the plaintext, to ensure the underlying plaintext remains accurate, without needing to decrypt the updated ciphertext, risking exposure and requiring extensive computational resources.

Pseudorandom Functions

A pseudorandom function (PRF) family is a collection of functions where each function is specified by a key such that the function may be evaluated deterministically with the key, but behaves like a random function without the key. In other words, each function in a PRF family is specified by a short random key and is easily computed given the key. However, when without the key and being computationally-bounded, the function appears to be a random function. For a PRF $F_k \in \mathcal{F}$, the index k is called its key (or seed). PRFs have a wide range of applications, most notably in cryptography, but also in computational complexity and computational learning theory.

The security of a scheme based on a PRF family is based on the collision resistance of the hash function H, hardness of binary learning with errors, and pseudorandomness of a homomorphic PRF family, for example, the key-homomorphic and bi-homomorphic PRF families described herein. An encryption scheme is provably secure if the probability of security failure is negligible. For security parameter $\lambda$, a function $\eta(\lambda)$ is called negligible if, for all $c>0$, there exists an $\lambda_0$ such that $$\eta(\mathbb{L}) < \frac{1}{\mathbb{L}^c}$$

for all $\mathbb{L} > \mathbb{L}_0$. Two ensembles are computationally indistinguishable if no efficient algorithm can tell the difference between them except with negligible probability. For two ensembles, $X=\{X_\lambda\}_{\lambda \in \mathbb{N}}$ and $Y=\{Y_\lambda\}_{\lambda \in \mathbb{N}}$, where $X_\lambda$'s and $Y_\lambda$'s are probability distributions over $\{0, 1\}^{\kappa(\lambda)}$ for $\lambda \in \mathbb{N}$ and some polynomial $\kappa(\lambda)$, then $\{X_\lambda\}_{\lambda \in \mathbb{N}}$ $\{Y_\lambda\}_{\lambda \in \mathbb{N}}$ are polynomially or computationally indistinguishable if the following holds for every (probabilistic) polynomial-time algorithm $\mathcal{D}$ and all $\lambda \in \mathbb{N}$:

$$\left| Pr\big[t \leftarrow X\_\lambda : \mathcal{D}(t) = 1\big] - Pr\big[t \leftarrow Y\_\lambda : \mathcal{D}(t) = 1\big] \right| \le \eta(\lambda)$$

where $\eta$ is a negligible function. Further $\{X_\lambda\}_{\lambda \in \mathbb{N}}$ and $\{Y_\lambda\}_{\lambda \in \mathbb{N}}$ are perfectly indistinguishable if the following holds for all t: $Pr[t \leftarrow X_\lambda] = Pr[t \leftarrow Y_\lambda]$.

Security is considered between adversaries interacting as part of probabilistic experiments, called games. For an adversary, $\mathcal{A}$ and two games $\mathfrak{G}_1$, $\mathfrak{G}_2$ with which the adversary can interact, $\mathcal{A}$'s distinguishing advantage is:

$$\mathrm{Adv}\_\mathcal{A}(\mathfrak{G}\_1, \mathfrak{G}\_2) := |Pr[\mathcal{A} \, accepts \, in \, \mathfrak{G}\_1] - Pr[\mathcal{A} \, accepts \, in \, \mathfrak{G}\_2]|.$$

For the security parameter $\mathbb{L}$, the two games are said to be computationally indistinguishable if it holds that: $Adv_\mathcal{A}(\mathfrak{G}_1, \mathfrak{G}_2) \le \eta(\mathbb{L})$, where $\eta$ is a negligible function.

Learning with errors (LWE) is a computation problem used in lattice-based cryptographic constructions. For positive integers w and $q \ge 2$ and an error (probability) distribution $\chi$ over $\mathbb{Z}$, the decision-$LWE_{w,q,\chi}$ problem is to distinguish between the following pairs of distributions: $((a_i, \langle a_i, s \rangle + e_i \bmod q))_i$ and $((a_i, u_i))_i$, where $$i \in [poly(w)], a_i \xleftarrow{\$} \mathbb{Z}_q^w, s \in \mathbb{Z}_q^w, e_i \leftarrow \chi,$$

$$\text{and}$$

$$u_i \xleftarrow{\$} \mathbb{Z}_q.$$

In the learning with rounding (LWR) problem, instead of adding a small random error, as done in LWE, a deterministically rounded version of the sample is generated. For $q \ge p \ge 2$, the rounding function, $\lfloor \bullet \rceil_p : \mathbb{Z}_q \to \mathbb{Z}_p$, is defined as:

$$\lfloor x \rceil_p = \left\lfloor \frac{p}{q} \cdot x \right\rceil,$$

i.e., if $\lfloor x \rceil_p = y$, then $$y \cdot \left\lfloor \frac{q}{p} \right\rceil$$

is the integer multiple of $$\left\lfloor \frac{q}{p} \right\rceil$$

that is nearest to x. Hence, the error in LWR originates from deterministically rounding x to a (relatively) nearby value in $\mathbb{Z}_p$. Let $q \ge p \ge 2$ be positive integers, then: for a vector, $s \in \mathbb{Z}_q^w$, LWR distribution $L_s$ defined to be a distribution over $\mathbb{Z}_q^w \times \mathbb{Z}_p$, that is obtained by choosing a vector $\xleftarrow{\$} \mathbb{Z}_q^w$ and outputting $(a, b = \lfloor \langle a, s \rangle \rceil_p$.

For a given distribution over $s \in \mathbb{Z}_q^w$ (e.g., the uniform distribution), the decision-$LWE_{w,q,\chi}$ problem is to distinguish (with advantage non-negligible in w) between some fixed number of independent samples $(a_i, b_i) \leftarrow L_s$, and the same number of samples drawn uniformly from $\mathbb{Z}_q^w \times \mathbb{Z}_p$. Decision-LWR can be as hard as decision-LWE for a setting of parameters where the modulus and modulus-to-error ratio are superpolynomial in the security parameter.

Figure 3:
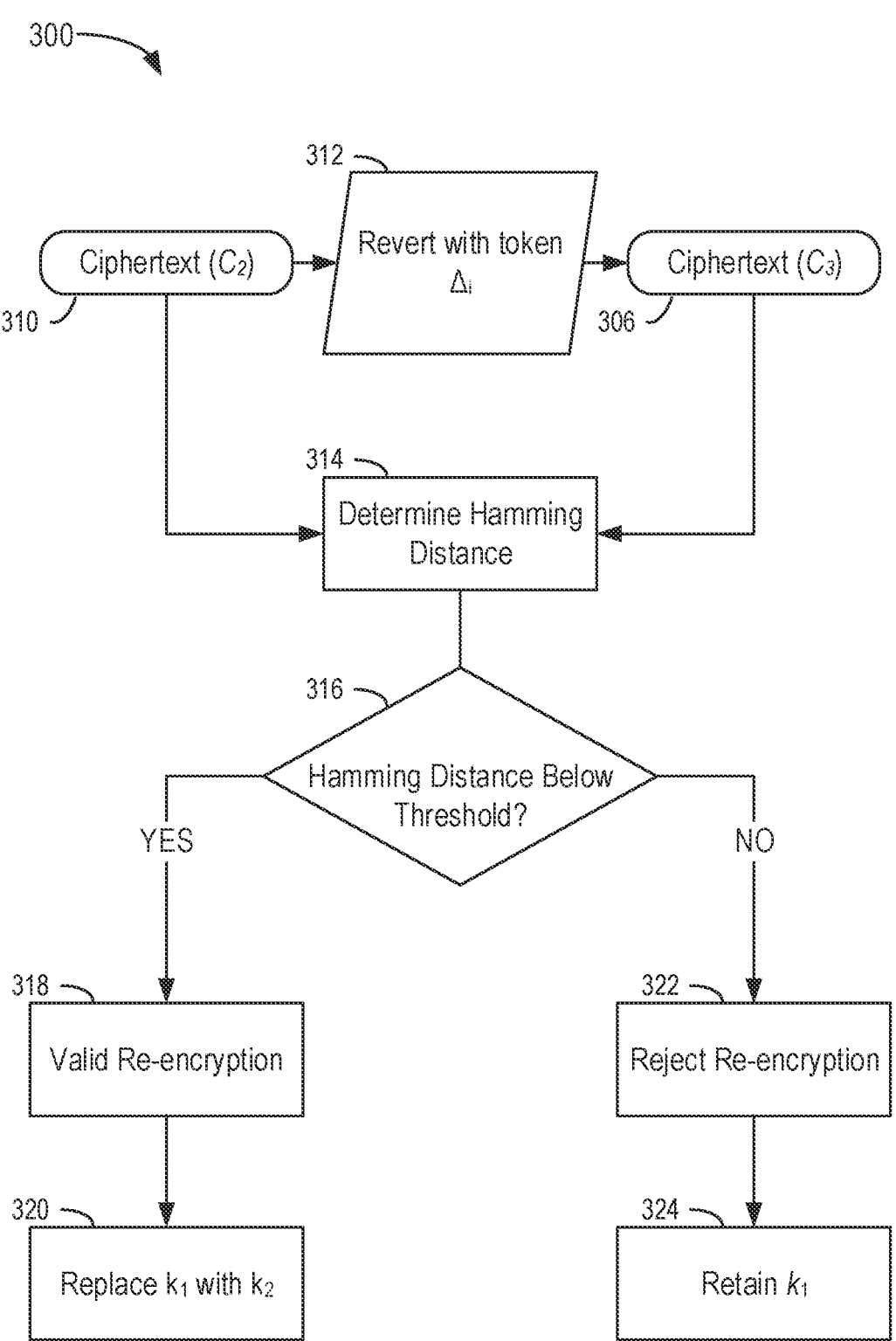
FIG. 3 depicts an example data flow for validating a key rotation.

Because the error generated by LWR is both short and deterministic, Gaussian elimination may be used to generate both the key and inputs, such that the Hamming distance between two ciphertexts $C_1$ and $C_2$, encrypting the same plaintext P, is predictable, allowing validation, as described with respect to FIG. 3.

As described above, PRF families are efficient distributions of functions that cannot be efficiently distinguished from the uniform distribution. For example, given two finite sets, A and B, let $\mathcal{F} = \{F_k : A \to B\}$ be a function family, endowed with an efficiently sampleable distribution (more precisely, $\mathcal{F}$, A, and B are all indexed by the security parameter $\mathbb{L}$). $\mathcal{F}$ is a PRF family if the following two games are computationally indistinguishable: (1) choose a function $F_k \in \mathcal{F}$ and give the adversary adaptive oracle access to $F_k$; and (2) choose a uniformly random function $U : A \to B$ and give the adversary adaptive oracle access to U.

Homomorphic encryption allows computation over encrypted data without accessing the key and the result remains encrypted. Encryption schemes based on homomorphic PRF families are described herein.

For example, a key-homomorphic PRF based probabilistic encryption scheme may be used for the key rotation methods described herein. Let $F : \mathcal{K} \times X \to \mathbb{Z}_q^w$ be an efficiently computable function such that $(\mathcal{K}, \oplus)$ is a group, where $\oplus$ denotes exclusive OR. The tuple $(F, \oplus)$ is a $\gamma$-almost key-homomorphic PRF if the following two properties hold: (1) F is a secure PRF, and (2) for all $k_1, k_2 \in \mathcal{K}$ and $x \in X$, there exists $e \in [0, \gamma]^w$ such that:

$$\big(F_{k_1}(x) + F_{k_2}(x) = F_{k_1 \oplus k_2}(x) + e \bmod q.$$

In another example, a bi-homomorphic PRF based probabilistic encryption scheme may be used for the key rotation methods described herein. Let $F : \mathcal{K} \times X \to \mathbb{Z}_p^{m \times m}$ be a PRF family, such that $(\mathcal{K}, \oplus)$ and $(X, \ominus)$ are groups, where $\oplus$ denotes exclusive OR, and $\ominus$ denotes symmetric difference. The tuple $(F, \ominus, \oplus)$ is a $\gamma$-almost fully key and partially input homomorphic PRF if one of the following conditions holds: (1) for every $k_1, k_2 \in \mathcal{K}$, and for every $x_1, x_2 \in X$, such that $x_{1,\ell} = x_{2,\ell} = x_\ell$, there exists a vector $E \in [0, \gamma]^{m \times m}$ such that:

$$F(k_1, x_1) + F(k_2, x_2) + E = F(k_1 \oplus k_2, x) \bmod p,$$

where $x = x\_\ell \| (x\_(1 \cdot r) \ominus x\_(2 \cdot r))$; or (2) for every $k_1$, $k_2 \in \mathcal{K}$, and for every $x_1$, $x_2 \in X$, such that $x_{1 \cdot r} = x_{2 \cdot r} = x_r$, there exists a vector $E \in [0, \gamma]^{m \times m}$ such that:

$$F(k_1, x_1) + F(k_2, x_2) + E = F(k_1 \oplus k_2, x) \bmod p,$$

where $x = (x\_(1 \cdot \ell) \ominus x\_(2 \cdot \ell)) \| x_r$.

In yet a further example, another bi-homomorphic PRF based probabilistic encryption scheme may be used for the key rotation methods described herein. Let $X \subset \mathcal{Y}$, with $\ominus$ defining the surjective mapping: $X \ominus X \to \mathcal{Y}$. Let $F: \mathcal{K} \times X \to \mathbb{Z}_p^{m \times m}$ and $F': \mathcal{K} \times \mathcal{Y} \to \mathbb{Z}_p^{m \times m}$ be two PRF families where $(\mathcal{K}, \oplus)$ is a group. The tuple $(F, \ominus, \oplus)$ is a $\gamma$-almost fully key and partially input homomorphic PRF with homomorphically induced variable input length, if one of the following conditions holds: (1) for every $k_1$, $k_2 \in \mathcal{K}$, and for every $x_1$, $x_2 \in X$, such that $x_{1.\ell} = x_{2.\ell} (= x_\ell)$, there exists a vector $E \in [0, \gamma]^{m \times m}$ such that:

$$F(k_1, x_1) + F(k_2, x_2) + E = F'(k_1 \oplus k_2, y) \bmod p,$$

where $y \in \mathcal{Y}$, such that $y = y\_\ell \| y_r$, with $y_\ell = x_\ell$ and $y_r = (x_{1.r} \ominus x_{2.r})$; or (2) for every $k_1$, $k_2 \in \mathcal{K}$, and $x_1$, $x_2 \in X$, such that $x_{1.r} = x_{2.r} = x_r$, there exists a vector $E \in [0, \gamma]^{m \times m}$ such that:

$$F(k_1, x_1) + F(k_2, x_2) + E = F'(k_1 \oplus k_2, y) \bmod p,$$

where $y \in \mathcal{Y}$, such that $y = y\_\ell \| y_r$, with $y_r = x_r$ and $y_\ell = (x_{1.\ell} \ominus x_{2.\ell})$.

For both key-homomorphic and bi-homomorphic PRF families, the output is a linear combination of the inputs. For example, for PRF families $F_s(y)$ and $F'_s(z_0, z_1)$, the output is a linear combination of the following for $b \in \{0, 1\}$:

$$A_b, A_{\neg b}$$

$$A_b, A_{x_0} G^{-1}(A_b)$$

$$A_{\neg b}, A_{x_0} G^{-1}(A_b)$$

$$A_b, A_{x_0} G^{-1}(A_{\neg b})$$

$$A_{x_0} G^{-1}(A_{\neg b} + A_{x_0} G^{-1}(A_b))$$

$$A_{x_0} G^{-1}(A_b + A_{x_0} G^{-1}(A_{\neg b}))$$

$$A_{x_0} G^{-1}(A_b + A_{x_0} G^{-1}(A_b))$$

with the seed (key) S included where applicable. Analogous combinations for B and C may easily be identified with an additional pseudorandomly-generated factor. The secret key s and S for the key-homomorphic families and the bi-homomorphic families, respectively, may be sampled such that the Hamming weight of the key is the smallest permitted by binary-LWE hardness proofs.

The correctness of the encryption is based on utilizing the PRF families described herein. Specifically, correctness follows because the PRF families are randomized linear combinations of their respective inputs, and validity, such as described below with respect to FIG. 3, is based on the selection of blocks of encryption, e.g., based on $$\Psi = \left\lceil 1 - \frac{1}{2^{\frac{B}{i}}} \right\rceil$$

such that the correctness probability is equal to $\Psi$.

Example Process for Storing and Updating Encryption Keys for Encrypted Data

FIG. 1 depicts an example key rotation process 100 for storing and updating encryption keys for encrypted data.

Key management component 116 is configured to manage encryption keys (such as secret keys s (or $k_1$) and S (or $k_2$)) for encrypted data stored in a database 108 by storing and rotating encryption keys associated with the encrypted data. Key management component 116 includes key rotation component 118, validation component 120, and key storage component 112.

Key rotation component 118 is configured to periodically rotate encryption keys, such as $k_1$ to $k_2$, through a probabilistic encryption scheme based on homomorphic PRF families, for example, described with respect to FIG. 2, below. Key rotation performed by key rotation component 118 is validated by validation component 120 before a rotated key, such as $k_2$, is stored in a key storage component 122, as described with respect to FIG. 3, below.

Through the key rotation process described herein, ciphertext $C_1$ 106 associated with $k_1$ 104 may be updated to ciphertext $C_2$ 110 associated with $k_2$ 112. In this example, database 108 is depicted as storing plaintext P 102 encrypted with $k_1$ 104 as ciphertext $C_1$ before key rotation. Database 114 is depicted as storing updated ciphertext $C_2$ 110, which is plaintext P 102 encrypted with $k_2$ 112. Although depicted here as two databases, the ciphertext may be stored in the same database before key rotation, depicted as database 108, and after key rotation, depicted as database 114.

Example Data Flow for Performing Key Rotation

Figure 2:
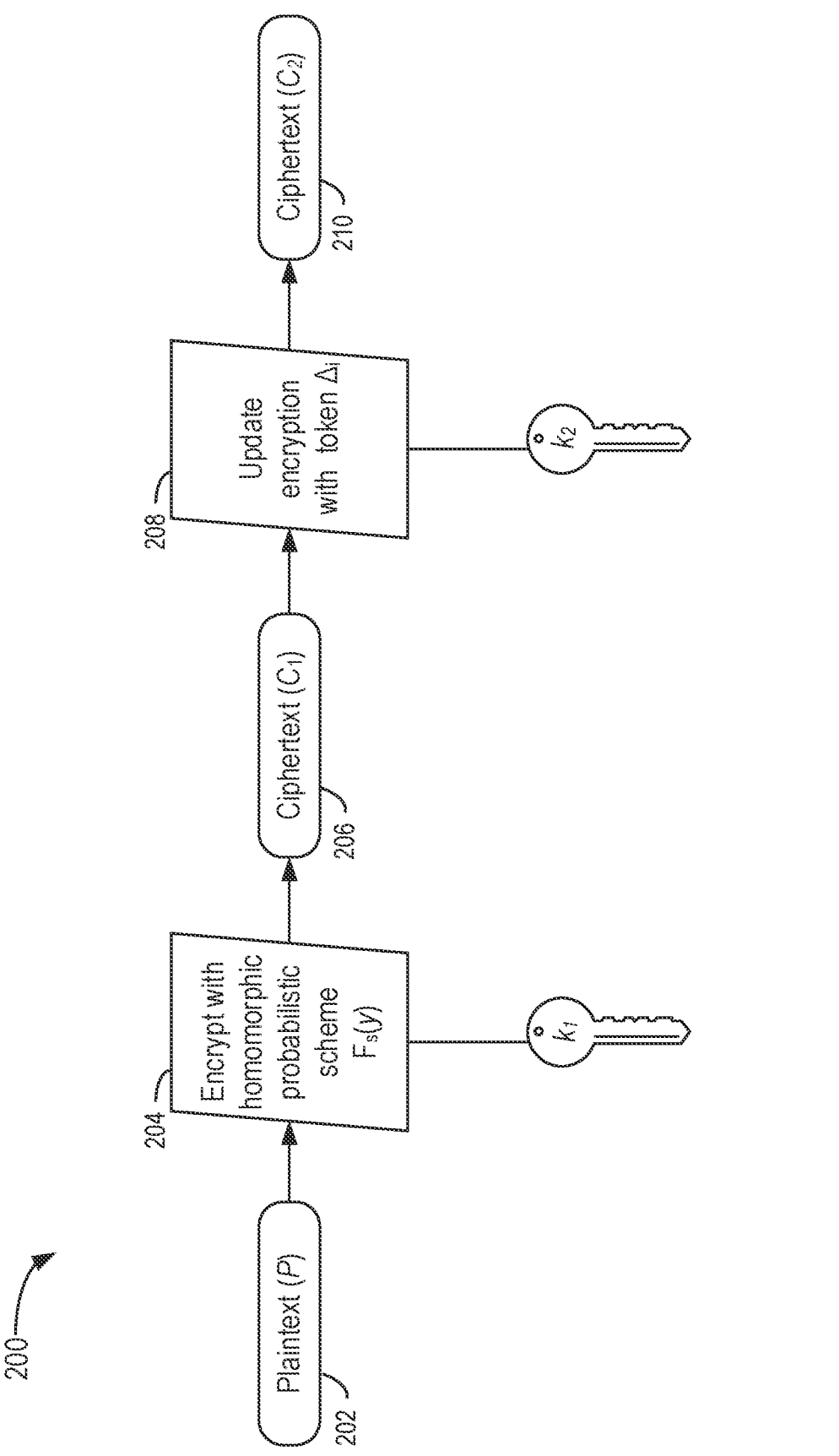
FIG. 2 depicts an example data flow for performing key rotation.

FIG. 2 depicts an example data flow 200 for key rotation using a homomorphic probabilistic encryption scheme, for example, by key rotation component 118 in FIG. 1.

Initially, flow 200 begins at step 204 with encrypting plaintext P 202, such as plaintext P 102 in FIG. 1, with a homomorphic probabilistic encryption scheme, $F_s(y)$, based on a first key $k_1$ to generate ciphertext $C_1$ 206.

In some embodiments, the homomorphic probabilistic encryption scheme is derived from a key-homomorphic PRF family. For example, when using the key-homomorphic PRF family, $F_s(y)$, the following operation is performed for encryption: $-F_{s_i}(H(D_i)) \oplus P_i$, where $H: \{0, 1\}^* \to \{0, 1\}^{|T|}$ is a cryptographic hash function and $D_i$ is the ID of the $i^{th}$ plaintext block, $P_i$.

The key-homomorphic PRF family is defined as: $\mathcal{F}_{A_0, A_1}, T_p = \{F_s: \{0, 1\}^{|T|} \to \mathbb{Z}_p^{wd}\}$, where $p \leq q$ is the modulus. A member of the function family $\mathcal{F}$ is indexed by the seed $s \in \mathbb{Z}_q^w$ as:

$$F_s(x) = \lfloor s \cdot A_T(x) \rceil_p.$$

$F_s(y)$ may be constructed as follows. Let T be a full binary tree with at least one node, i.e., every non-leaf node in T has two children. Let T·r and T·l denote its right and left subtree, respectively, and $\lfloor \cdot \rceil_p$ denote the rounding function from LWR, as described above. Let $q \geq 2$, $d = \lceil \log q \rceil$, and $x[i]$ denote the $i^{th}$ bit of a bit-string $x$. Define a gadget vector as:

$$g = (1, 2, 4, \ldots, 2^{d-1}) \in \mathbb{Z}_q^d.$$

Further, define a decomposition function $g^{-1}: \mathbb{Z}_q \to \{0, 1\}^d$ such that $g^{-1}(a)$ is a "short" vector and $\forall a \in \mathbb{Z}_q$, it holds that: $\langle \mathbf{g}, g^-(a) \rangle = a$, where $\langle \cdot \rangle$ denotes the inner product.

$$g^{-1}(a) = (x[0], x[1], \ldots, x[d-1]) \in \{0, 1\}^d$$

where $a = \sum_{i=0}^{d-1} x[i] \cdot 2^i$ is the binary representation of $a$.

The gadget vector is used to define the gadget matrix $G$ as:

$$G = I_w \otimes g = \text{diag}(g, \ldots, g) \in \mathbb{Z}_q^{w \times wd}.$$

where $I_w$ is the $w \times w$ identity matrix and $\otimes$ denotes the Kronecker product. The binary decomposition function, $g^{-1}$, is applied entry-wise to vectors and matrices over $\mathbb{Z}_q$. Thus, $g^{-1}$ can be extended to get another deterministic decomposition function $G^{-1}: \mathbb{Z}_q^{w \times u} \to \{0, 1\}^{wd \times u}$ such that $G \cdot G^{-1}(A) = A$.

Given uniformly sampled matrices, $A_0$, $A_1 \in \mathbb{Z}_q^{w \times wd}$, define a function:

$$A_T(x): \{0, 1\}^{|T|} \to \mathbb{Z}_q^{w \times wd} \text{ as: } A_T(x) = \begin{cases} A_x & \text{if } |T| = 1, \\ A_{T,l}(x_l) \cdot G^{-1}(A_{T,r}(x_r)) & \text{otherwise,} \end{cases}$$

where $|T|$ denotes the total number of leaves in $T$ and $x \in \{0, 1\}^{|T|}$ such that $x = x_l \| x_r$ for both $x_l \in \{0, 1\}^{|T \cdot l|}$ and $x_r \in \{0, 1\}^{|T \cdot r|}$.

Thus, the key-homomorphic PRF family is defined as:

$$\mathcal{F}_{A_0, A_1, T, p} = \left\{ F_s: \{0, 1\}^{|T|} \to \mathbb{Z}_p^{wd} \right\}$$

where $p \leq q$ is the modulus and a member of the function family $\mathcal{F}$ is indexed by the seed $s \in \mathbb{Z}_q^w$ as: $F_s(x) = \lfloor s \cdot A_T(x) \rceil_p$.

In some embodiments, the homomorphic probabilistic encryption scheme is derived from a bi-homomorphic PRF family. In terms of the PRF family, $F_S(y)$, the following operation is performed for encryption: $-F_{S_i}(H(D_i), y_{rh}) \oplus B_i$, where $H: \{0, 1\}^* \to \{0, 1\}^{|T|}$ is a cryptographic hash function, $y_{rh} \xleftarrow{\$} \{0, 1\}^{|T|}$, and $D_i$ is the ID of the $i^{th}$ plaintext block, $P_i$. A member of the function family $\mathcal{F}'_{(\mathbb{A}, T, p)}$ is defined as:

$$F_s'(z_0, z_1) := \left\lfloor S^T \cdot A_T(z_0) + R_0(z_0) \cdot G^{-1}(C_T^S(z_1)) \right\rceil_p, \text{ where}$$

$$R_0(z_0) = R(z_0) \cdot A_{z_0[0]}.$$

Construction of is subsequently described $F'_s(y)$ as follows. Let $x_{lh}$ be the left half of $x$, such that $$|x_{\ell h}| = \left\lfloor \left\| \frac{x}{2} \right\| \right\rfloor.$$

Let $x_{rh}$ be the right half of $x$, such that $$|x_{rh}| = \left\lceil \left\| \frac{x}{2} \right\| \right\rceil.$$

Let $x[i]$ be the $i^{th}$ bit of $x$. Let $T$ be a full binary tree with at least one node, with $T \cdot r$ and $T \cdot \ell$ denoting its right and left subtree, respectively. For random matrices $A_0, A_1 \in \mathbb{Z}_q^{n \times nd}$, define function $A_T: \{0, 1\}^{|T|} \to \mathbb{Z}_q^{n \times nd}$ recursively as:

$$A_T(x) = \begin{cases} A_x & \text{if } |T| = 1 \\ A_{T, \ell}(x_\ell) + A_{x[0]} G^{-1}(A_{T, r}) & \text{otherwise} \end{cases}$$

where $x = x\ell \| x_r$, $x_\ell \in \{0, 1\}^{|T \cdot \ell|}$, $x_r \in \{0, 1\}^{|T \cdot r|}$, and $|T|$ denotes the number of leaves in $T$.

Based on the random seed $S \in \mathbb{Z}_q^{n \times nd}$, the KIH-PRF family, $\mathcal{F}_{(A_0, A_1, T, p)}$, is defined as: $\mathcal{F}_{(A_0, A_1, T, p)} = \{F_s: \{0, 1\}^{2|T|} \to \mathbb{Z}_p^{nd \times nd}\}$. Two seed dependent matrices, $B_0$, $B_1 \in \mathbb{Z}_q^{n \times nd}$ are defined as: $B_0 = A_0 + S$ $B_1 = A_1 + S$. Using the seed dependent matrices, a function $B_T^S(x)$ is defined recursively as:

$$B_T^S(x) = \begin{cases} B_x & \text{if } |T| = 1 \\ B_{T, \ell}^S(x_\ell) + A_{x[0]} G^{-1}\left(B_{T, r}^S(x_r)\right) & \text{otherwise} \end{cases}$$

Let $R: \{0, 1\}^{|T|} \to \mathbb{Z}_q^{nd \times n}$ be a pseudorandom generator. Let $y = y\_\ell h \| y_{rh}$, where $y_{\ell h}, y_{rh} \in \{0, 1\}^{|T|}$. In order to keep the length of the equations in check, the product $R(y_{\ell h}) \cdot A_{y[0]}$ may be represented by the notation: $R_0(y_{\ell h})$. A member of the KIH-PRF family is indexed by the seed $S$ as:

$$F_S(y) := \left\lfloor S^T \cdot A_T(y_{\ell h}) + R_0(y_{\ell h}) \cdot G^{-1}\left(B_T^S(y_{rh})\right) \right\rceil_p.$$

Let $\overline{0} = 00$, i.e., it represents two consecutive 0 bits. Define the following function family:

$$\mathcal{F}'_{(\mathbb{A}, T, p)} = \left\{ F_S': \{0, 1\}^{|T|} \times \{0, 1, \overline{0}\}^{|T|} \to \mathbb{Z}_p^{nd \times nd} \right\},$$

where $\mathbb{A} = \{A_0, A_1, B_0, B_1, C_0, C_1, \overline{C}_0\}$, and where the matrices $C_1, C_0, \overline{C}_0$ are defined by the seed $S \in \mathbb{Z}_q^{n \times nd}$ as: $C_1 = A_0 + B_1$; $\overline{C}_0 = A_0 + B_0$; $C_0 = A_1 + B_1$.

Define a function $C_T: \{0, 1\}^{|T|} \times \{0, 1, \overline{0}\}^{|T|} \to \mathbb{Z}_q^{n \times nd}$ recursively as:

$$C_T^S(x) = \begin{cases} C_x & \text{if } |T| = 1 \\ \overline{C}_0 & \text{if } |T| > 1 \wedge x[i] = x[i+1] = 0 \\ C_{T, \ell}^S(x_\ell) + A_{x[0]} G^{-1}\left(C_{T, r}^S(x_r)\right) & \text{otherwise} \end{cases}$$

i.e., $\overline{C}_0$ denotes two bits. Hence, during the evaluation of $$C_T^S(x),$$

a leaf in T may represent one bit or two bits. Let $z=z\_0\|z_1$, where $z_0 \in \{0, 1\}^{|T|}$ and $z_1 \in \{0, 1, \overline{0}\}^{|T|}$. Thus, a member of the function family $\mathcal{F}_{(\mathbb{A}, T, P)}$ is defined as:

$$F_S'(z_0, z_1) := \left\lfloor S^T \cdot A_T(z_0) + R_0(z_0) \cdot G^{-1}\left(C_T^S(z_1)\right)\right\rfloor_p \text{ where}$$

$$R_0(z_0) = R(z_0) \cdot A_{z_0[0]}.$$

Beneficially, a bi-homomorphic PRF family may be utilized to achieve maximum entropy because $z_1$ and $y_{rh}$ do not need to be equal, and can be sampled uniformly where the Hamming distance requirements are satisfied. For example, the Hamming distance requirement may be $d(z_1, y_{rh}) \leq c$, as described below. Additionally, the input length may be increased when moving from $\{0, 1\}$ to $\{0, 1, \overline{0}\}$.

At step 208, ciphertext $C_1$ 206 is updated to ciphertext $C_2$ 210 with an updating token $\Delta_i$. By using the updating token $\Delta_i$, ciphertext $C_1$ 206 associated with $k_1$ is updated to ciphertext $C_2$ 210 associated with $k_2$. Thus, the encryption key associated with the plaintext is rotated.

In embodiments where the ciphertext $C_1$ 206 is encrypted based on a key-homomorphic PRF family, the updating token is: $\Delta_i = F_{s_2}(H(D_i)) - F_{s_1}(H(D_i))$.

In embodiments where the ciphertext $C_1$ 206 is encrypted based on a bi-homomorphic PRF family, the updating token is $\Delta_i = F'_{s_2}(H(D_i), z_1) - F_{s_1}(H(D_i), y_{rh})$, where $z_1$ is chosen such that the following holds for the Hamming distance: $d(z_1, y_{rh}) \leq c$, where $c \in \mathbb{N}$ is a constant.

Note that flow 200 is just one example, and other flows including fewer, additional, or alternative steps, consistent with this disclosure, are possible.

Example Flow for Validating a Key Rotation

FIG. 3 depicts an example flow 300 for validating key rotation, such as a key rotation performed according to flow 200 described with respect to FIG. 2.

At step 312, a set of blocks of ciphertext $C_2$ 310 is randomly selected with cardinality B. The cardinality of a set is a measure of the number of elements of the set, thus, blocks of ciphertext $C_2$ 310 may be randomly selected to obtain B number of blocks for the set. B is computed based on the desired probability of correctness $\Psi$, where $$\Psi = \left\lfloor 1 - \frac{1}{2^{\frac{B}{t}}} \right\rfloor.$$

Each block of the set of blocks of ciphertext $C_2$ 310 is reverted to a block of ciphertext $C_3$ 306, forming a set of blocks of ciphertext $C_3$ 306 (by $C_2 - \Delta_i$ (from step 208 in FIG. 2)).

At step 314, the Hamming distance between the encryptions of each of the corresponding blocks from ciphertext $C_3$ 306 and ciphertext $C_2$ 310 is determined. The Hamming weight wt(v) of $v \in \mathbb{F}^n$ is the number of nonzero entries in v. The Hamming distance d(u, v) between u, $v \in \mathbb{F}^n$ is the number of positions in which they differ, i.e., d(u, v)=wt(u−v). For example, the Hamming distance between "karolin" and "kathrin" is 3.

At step 316, the Hamming distance between each block of ciphertext $C_3$ 306 and ciphertext $C_2$ 310, determined at step 314, is compared to a threshold. The threshold may be based on t and the maximum Hamming distance between any two keys. For example, as described herein, a maximum Hamming weight may be set for the secret key vector or matrix. Because low-norm keys are described herein, the threshold Hamming weight of each key will be much smaller than n or w, representing the dimension of the lattice. Where t is the threshold Hamming weight for each key, then for any two keys, the maximum threshold Hamming distance is 2t<<n, where << denotes "much smaller than."

In embodiments where the encryption scheme is a key-homomorphic PRF probabilistic encryption scheme, the threshold may be t+1. If the Hamming distance between the encryptions of all the blocks from the set of blocks of ciphertext $C_3$ 306 and the set of blocks of ciphertext $C_2$ 310 is less than the threshold, then flow 300 proceeds to step 318.

In embodiments where the encryption scheme is a bi-homomorphic PRF probabilistic encryption scheme, the threshold may be t+c, where $c \in \mathbb{N}$ is a constant. In embodiments, c is set with a maximum of $$n^{\frac{1}{z}}$$

for some integer $z \approx t$. If the Hamming distance between the encryptions of all the blocks from the set of blocks of ciphertext $C_3$ 306 and the set of blocks of ciphertext $C_2$ 310 is less than the threshold, then flow 300 proceeds to step 318.

At step 318, ciphertext $C_2$ is determined to be a valid re-encryption of the plaintext P.

Figure 4:
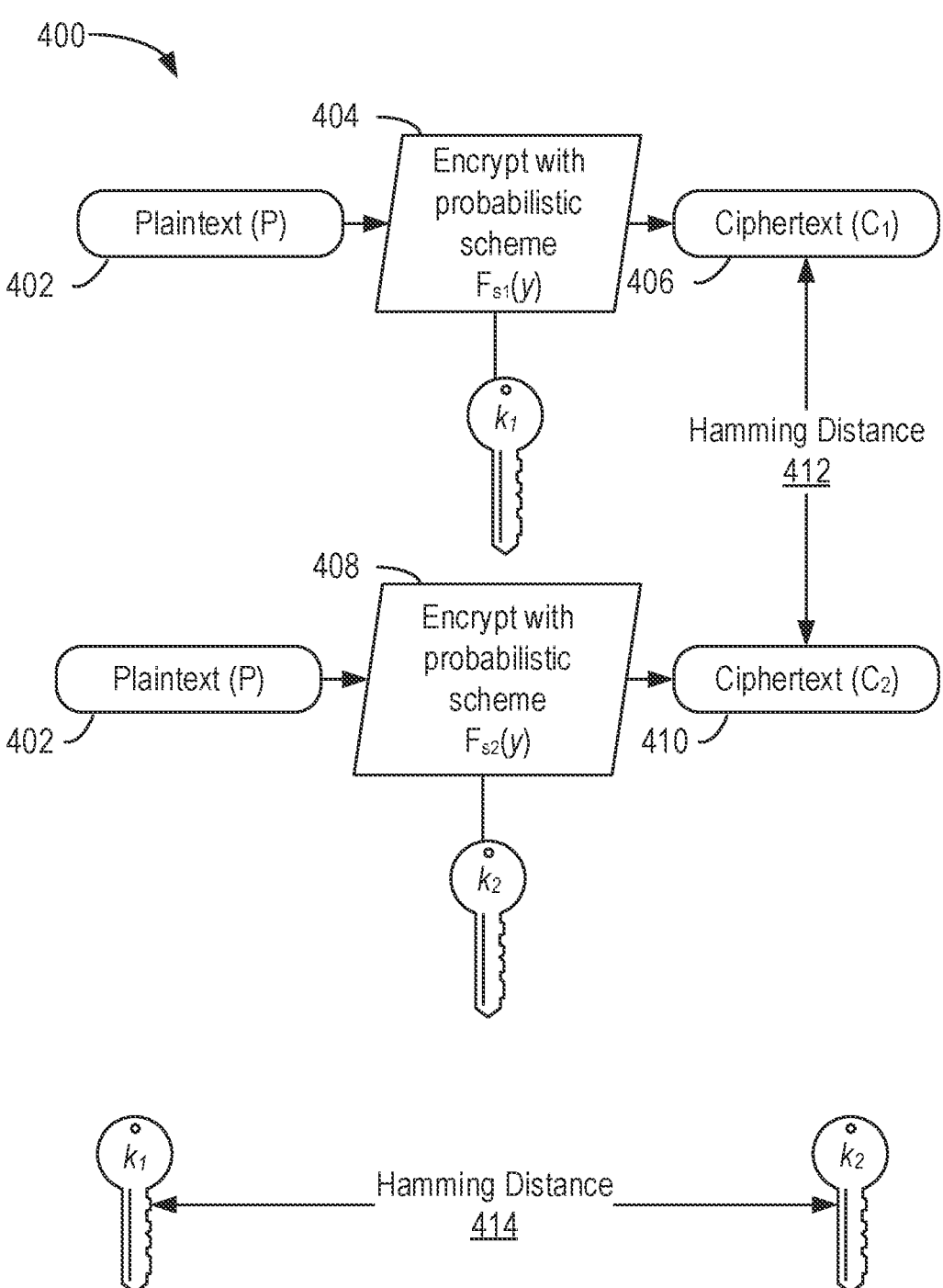
FIG. 4 depicts an example proof of validation of a key rotation.

As depicted in FIG. 4, the Hamming distance 414 between $k_1$, $k_2$, may be determined because $k_1$, $k_2$, are known based on the encryption scheme used in FIG. 2.

The Hamming distance 412 between two ciphertexts, ciphertext $C_1$ 406 generated by encrypting plaintext P 402 with a probabilistic scheme based on $k_1$ at step 404, and ciphertext $C_2$ 410 generated by encrypting plaintext P 402 with a probabilistic scheme based on $k_2$ at 408 may be predicted based on the Hamming distance 414 between $k_1$ and $k_2$. This is because $k_1$ and $k_2$ are sampled from a binary distribution with a low norm such that the Hamming weight of each key is below a fixed threshold. The threshold may be determined based on the binary-LWE problem and desired security against quantum probabilistic polynomial time (PPT) adversaries. For example, the threshold may be $$\sqrt{\frac{m}{n}}\sigma,$$

where $\sigma$ is the standard deviation of the Gaussian distribution used to sample the binary errors. As used here, n denotes the dimension of the lattice and m denotes the number of samples the adversary is provided by the LWE oracle, as described above. Further, m may be [poly(n)], however, it may be limited based on the desired settings and the implementation. Having such a key implies that the key- and bi-homomorphic PRF families output a randomized linear combination of the output of another randomized linear function on the input.

Therefore, performing updatable encryption procedure from FIG. 2 on plaintext P with different keys, $k_1$, $k_2$, yields outputs whose Hamming distance, e.g., Hamming distance 412, can be predicted with respect to the Hamming distance 414 between $k_1$, $k_2$, without needing to compute the Hamming distance 412 by generating ciphertext $C_1$ and ciphertext $C_2$ at step 404 and step 408, respectively.

Thus, returning to step 318 in FIG. 3, the ciphertext $C_2$ 310 may be accepted as a valid re-encryption of plaintext P.

At step 320, the encryption key is rotated, by replacing the previous key $k_1$ associated with ciphertext $C_1$ with the new key $k_2$ associated with ciphertext $C_2$.

If at step 316, the Hamming distance between the encryptions of all the blocks from the set of blocks of ciphertext $C_3$ 306 and the set of blocks of ciphertext $C_2$ 310 is greater than or equal to the threshold, then flow 300 proceeds to step 322 with rejecting ciphertext $C_2$ 310 as a valid re-encryption of the plaintext P. At step 324, the previous key $k_1$ associated with ciphertext $C_1$ is retained.

In some embodiments, where the re-encryption is rejected as an invalid key rotation, a subsequent key rotation is performed, such as described with respect to FIG. 2.

In some embodiments, the Hamming distance may be replaced with the Renyi divergence (RD). RD is a measure of the closeness of two probability distributions. Let P and Q be probability measures on some measurable space with p and q denoting their respective densities with respect to a common σ-finite dominating measure μ. Then, $\alpha \in R^+\backslash\{0, 1, \infty\}$, the RD $D_\alpha$ between P and Q is defined as:

$$q \geq 2, \, D_\alpha(P \| Q) = \frac{1}{\alpha - 1}\log \int p^\alpha q^{1-\alpha} d\mu$$

where $p^\alpha q^{1-\alpha}=0$ if p=q=0, and x/0=∞ for x>0. Let X, Y be a pair of discrete random variables such that the value of X is determined from the value of Y by asking questions in the form: "Is X equal to x?" until the answer is affirmative. Where the RD distance between each block of ciphertext $C_3$ and ciphertext $C_2$, is within a predicted range, then ciphertext $C_2$ is accepted as a valid re-encryption of plaintext P.

Note that flow 300 is just one example, and other flows including fewer, additional, or alternative steps, consistent with this disclosure, are possible.

Example Method for Key Rotation

FIG. 5 depicts an example method 500 for key rotation of an encryption key, such as by a key rotation component, for example, key rotation component 118 in FIG. 1.

Initially, method 500 begins at step 502 with generating a first ciphertext by encrypting a plaintext with a homomorphic probabilistic encryption scheme based on a first key, such as described with respect to step 204 in FIG. 2.

In some embodiments, the homomorphic probabilistic encryption scheme is derived from a key-homomorphic pseudorandom function family.

In some embodiments, the homomorphic probabilistic encryption scheme is derived from a bi-homomorphic pseudorandom function family.

Method 500 proceeds to step 504 with generating an updating token based on a difference between the homomorphic probabilistic encryption scheme based on the first key and the homomorphic probabilistic encryption scheme based on a second key.

In embodiments where the encryption is based on a key-homomorphic PRF family, the updating token is: $\Delta_i = F_{s_2}(H(D_i)) - F_{s_1}(H(D_i))$. As described above, the updating token is generated using $F_s(H(D_i)) \oplus P_i$, given H:$\{0, 1\}^* \rightarrow \{0, 1\}^{|T|}$ is a cryptographic hash function and $D_i$ is the ID of the $i^{th}$ plaintext block, $P_i$, for a first key $s_1$ and for a second key $s_2$. In embodiments where the encryption is based on a bi-homomorphic PRF family, the updating token is $\Delta_i = F'_{s_2}(H(D_i), z_1) - F_{s_1}(H(D_i), y_{rh})$, where $z_1$ is chosen such that the following holds for the Hamming distance: $d(z_1, y_{rh}) \leq c$, where $c \in \mathbb{N}$ is a constant. As described above, the updating token is generated using $F_{s_1}(H(D_i), y_{rh}) \oplus B_i$, where H:$\{0, 1\}^* \rightarrow \{0, 1\}^{|T|}$ is a cryptographic hash function, $y_{rh} \xleftarrow{\$} \{0, 1\}^{|T|}$, and $D_i$ is the ID of the $i^{th}$ plaintext block, $P_i$, for a first key $s_1$ and $$F'_S(z_0, z_1) := \left\lfloor S^T \cdot A_T(z_0) + R_0(z_0) \cdot G^{-1}\left(C_T^S(z_1)\right)\right\rfloor_p,$$

where $R_0(z_0) = R(z_0) A_{z_0[0]}$, for a second key $s_2$.

Method 500 then proceeds to step 506 with generating a second ciphertext by encrypting the first ciphertext with the updating token, such as described with respect to step 208 in FIG. 2.

In some embodiments, method 500 further comprises: selecting a set of second ciphertext blocks from the second ciphertext, such as described with respect to step 312 in FIG. 3; reverting the set of second ciphertext blocks with the updating token to a set of third ciphertext blocks; and computing a Hamming distance between blocks of the set of second ciphertext blocks and the corresponding set of third ciphertext blocks, such as described with respect to step 314 in FIG. 3.

In some embodiments, the set of third ciphertext blocks corresponds to a set of blocks selected from the first ciphertext.

In some embodiments, in response to determining the Hamming distance is less than a threshold, method 500 further comprises validating the second ciphertext, such as described with respect to step 318 in FIG. 3; and replacing the first key with the second key as the encryption key for the plaintext, such as described with respect to step 320 in FIG. 3.

In some embodiments in response to determining the Hamming distance is greater than a threshold, method 500 further comprises rejecting the second ciphertext, such as described with respect to step 322 in FIG. 3; and retaining the first key as the encryption key for the plaintext, such as described with respect to step 324 in FIG. 3.

In some embodiments, method 500 further comprises generating a second updating token based on a difference between the homomorphic probabilistic encryption scheme based on the first key and the homomorphic probabilistic encryption scheme based on a fourth key; and generating a fourth ciphertext by encrypting the first ciphertext with the second updating token, such as described with respect to flow 200 in FIG. 2.

In some embodiments, method 500 further comprises: selecting a set of second ciphertext blocks from the second ciphertext; reverting the set of second ciphertext blocks with the updating token to a set of third ciphertext blocks; and computing a Renyi divergence between blocks of the set of second ciphertext blocks and the corresponding set of third ciphertext blocks, such as described with respect to FIG. 3.

In some embodiments, method 500 further comprises: in response to determining the Renyi divergence is between a predicted range, validating the second ciphertext; and replacing the first key with the second key as the encryption key for the plaintext, such as described with respect to FIG. 3.

Note that method 500 is just one example, and other flows including fewer, additional, or alternative steps, consistent with this disclosure, are possible.

Example Processing Systems for Managing Blockchain Addresses

Figure 6:
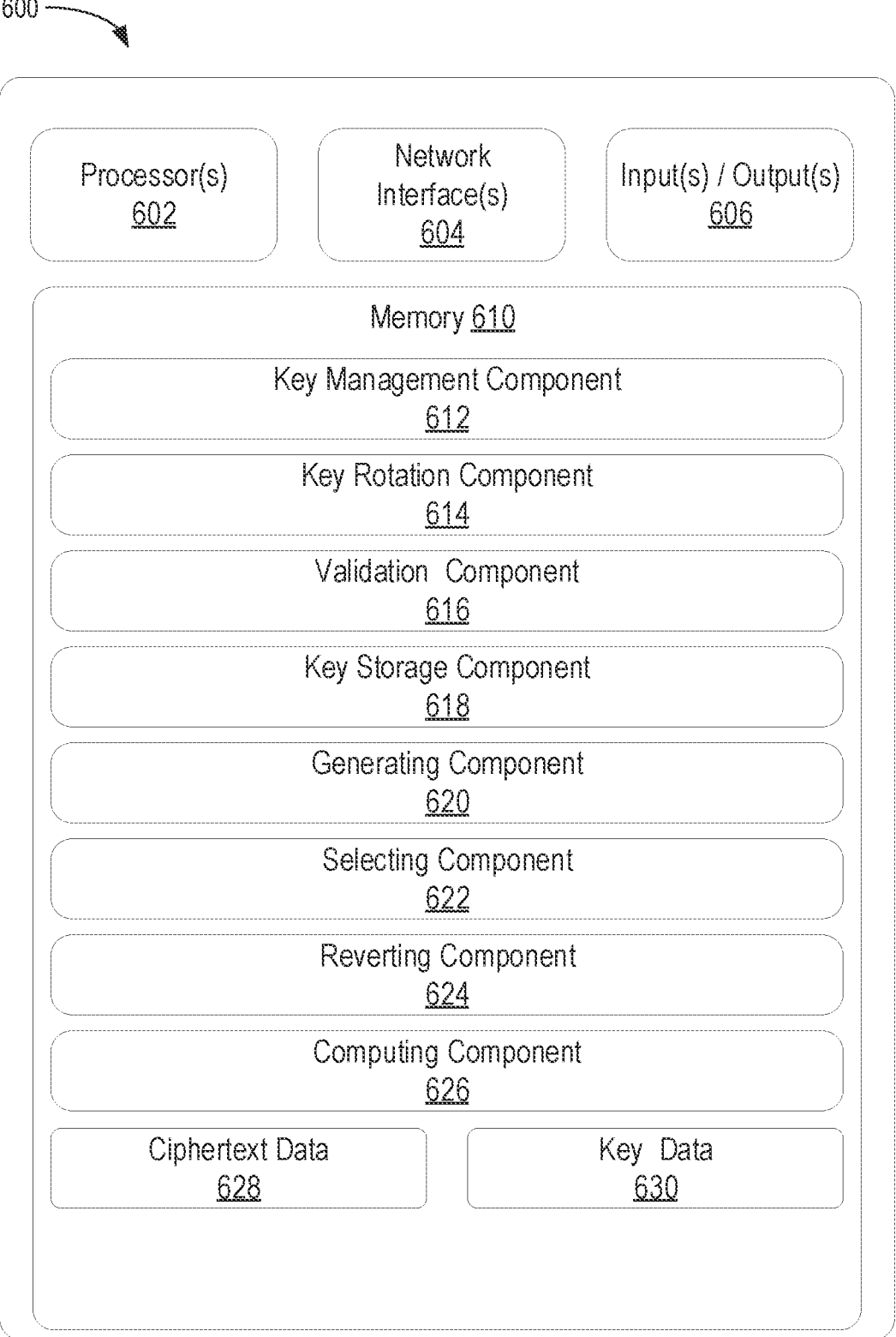
FIG. 6 depicts an example processing system for performing various aspects described herein.

FIG. 6 depicts an example processing system configured for performing various aspects described herein, for example, Processing system 600 includes one or more processors 602. Generally, processor(s) 602 may be configured to execute computer-executable instructions (e.g., software code) to perform various functions, as described herein.

Processing system 600 further includes one or more network interfaces 604, which generally provide data access to any sort of data network, including personal area networks (PANs), local area networks (LANs), wide area networks (WANs), the Internet, and the like. In some cases, network interface(s) 604 provide access to blockchain networks, including source and destination blockchain networks, such as described above.

Processing system 600 further includes input(s) and output(s) 606, which generally provide means for providing data to and from processing system 600, such as via connection to computing device peripherals, including user interface peripherals.

Processing system 600 further includes a memory 610 configured to store various types of components and data. In this example, memory 610 includes a key management component 612; a key rotation component 614; a validation component 616; a key storage component 618; a generating component 620; a selecting component 622; a reverting component 624; a computing component 626; a ciphertext data 628; and key data 630.

In some embodiments, key management component 612, such as key management component 116 in FIG. 1, is configured to manage keys and key rotation, for example, flow 200 in FIG. 2, flow 300 in FIG. 3, and method 500 in FIG. 5.

In some embodiments, key rotation component 614, such as key rotation component 118 in FIG. 1, is configured to rotate keys for example, flow 200 in FIG. 2 and method 500 in FIG. 5.

In some embodiments, validation component 616, such as validation component 120, is configured to validate key rotation, for example, flow 300 in FIG. 3.

In some embodiments, key storage component 618, such as key storage component 112 in FIG. 1, is configured to store keys, such as in key data 630.

In some embodiments, generating component 620 is configured to generate a first ciphertext by encrypting a plaintext with a homomorphic pseudorandom function probabilistic encryption scheme based on a first key, such as described with respect to step 204 in FIG. 2 or step 502 in FIG. 5; generate an updating token based on a difference between the homomorphic probabilistic encryption scheme pseudorandom function based on the first key and the homomorphic probabilistic encryption scheme function based on a second key, such as described with respect to step 504 in FIG. 5; or generate a second ciphertext by encrypting the first ciphertext with the updating token, such as described with respect to step 208 in FIG. 2 or step 506 in FIG. 5, stored as ciphertext data 628.

In some embodiments, selecting component 622 is configured to select a set of second ciphertext blocks from the second ciphertext, such as described with respect to step 312 in FIG. 3. For example, the set of blocks of ciphertext is randomly selected with a cardinality of B.

In some embodiments, reverting component 624 is configured to revert the set of second ciphertext blocks with the updating token to a set of third ciphertext blocks, such as described with respect to step 315 in FIG. 3.

In some embodiments, computing component 626 is configured to compute a Hamming distance between blocks of the set of second ciphertext blocks and the corresponding set of third ciphertext blocks, such as described with respect to step 316 in FIG. 3. In some embodiments, computing component 626 is configured to compute a Renyi divergence between blocks of the set of second ciphertext blocks and the corresponding set of third ciphertext blocks.

Processing system 600 may be implemented in various ways. For example, processing system 600 may be implemented within on-site, remote, or cloud-based processing equipment.

Note that while depicted as a single processing system in FIG. 6, aspects of processing system 600 may be distributed among a plurality of processing systems. For example, each of the steps of method 500 described above with respect to FIG. 5 may be performed on a separate processing system (not depicted).

Processing system 600 is just one example, and other configurations are possible. For example, in alternative embodiments, aspects described with respect to processing system 600 may be omitted, added, or substituted for alternative aspects.

Example Clauses

Implementation examples are described in the following numbered clauses:

Clause 1: A method for key rotation of an encryption key, comprising: generating a first ciphertext by encrypting a plaintext with a homomorphic pseudorandom function probabilistic encryption scheme based on a first key; generating an updating token based on a difference between the homomorphic probabilistic encryption scheme pseudorandom function based on the first key and the homomorphic probabilistic encryption scheme function based on a second key; and generating a second ciphertext by encrypting the first ciphertext with the updating token.

Clause 2: The method of clause 1, further comprising: selecting a set of second ciphertext blocks from the second ciphertext; reverting the set of second ciphertext blocks with the updating token to a set of third ciphertext blocks; and computing a Hamming distance between blocks of the set of second ciphertext blocks and the corresponding set of third ciphertext blocks.

Clause 3: The method of clause 2, further comprising: in response to determining the Hamming distance is less than a threshold, validating the second ciphertext; and replacing the first key with the second key as the encryption key for the plaintext.

Clause 4: The method of clause 2, further comprising: in response to determining the Hamming distance is greater than a threshold, rejecting the second ciphertext; and retaining the first key as the encryption key for the plaintext.

Clause 5: The method of clause 4, further comprising: generating a second updating token based on a difference between the homomorphic probabilistic encryption scheme pseudorandom function based on the first key and the homomorphic probabilistic encryption scheme function based on a fourth key, and generating a fourth ciphertext by encrypting the first ciphertext with the second updating token.

Clause 6: The method of any one of clauses 2-5, wherein the set of third ciphertext blocks corresponds to a set of blocks selected from the first ciphertext.

Clause 7: The method of clause 1, further comprising: selecting a set of second ciphertext blocks from the second ciphertext; reverting the set of second ciphertext blocks with the updating token to a set of third ciphertext blocks; and computing a Renyi divergence between blocks of the set of second ciphertext blocks and the corresponding set of third ciphertext blocks.

Clause 8: The method of clause 7, further comprising: in response to determining the Renyi divergence is between a predicted range, validating the second ciphertext; and replacing the first key with the second key as the encryption key for the plaintext.

Clause 9: The method of clause 7, further comprising: in response to determining the Renyi divergence is not between a predicted range, rejecting the second ciphertext; and retaining the first key as the encryption key for the plaintext.

Clause 10: The method of any one of clauses 7-9, wherein the set of third ciphertext blocks corresponds to a set of blocks selected from the first ciphertext.

Clause 11: The method of any one of clauses 1-10, wherein the homomorphic probabilistic encryption scheme function comprises a probabilistic scheme derived from a key-homomorphic pseudorandom function family.

Clause 12: The method of any one of clauses 1-10, wherein the homomorphic probabilistic encryption scheme function comprises a probabilistic scheme that is derived from a bi-homomorphic pseudorandom function family.

Clause 13: A processing system, comprising: a memory comprising computer-executable instructions; and a processor configured to execute the computer-executable instructions and cause the processing system to perform a method in accordance with any one of Clauses 1-12.

Clause 14: A processing system, comprising means for performing a method in accordance with any one of Clauses 1-12.

Clause 15: A non-transitory computer-readable medium storing program code for causing a processing system to perform the steps of any one of Clauses 1-12.

Clause 16: A computer program product embodied on a computer-readable storage medium comprising code for performing a method in accordance with any one of Clauses 1-12.

ADDITIONAL CONSIDERATIONS

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c). Reference to an element in the singular is not intended to mean only one unless specifically so stated, but rather "one or more." For example, reference to an element (e.g., "a processor," "a memory," etc.), unless otherwise specifically stated, should be understood to refer to one or more elements (e.g., "one or more processors," "one or more memories," etc.). The terms "set" and "group" are intended to include one or more elements, and may be used interchangeably with "one or more." Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions. Unless specifically stated otherwise, the term "some" refers to one or more.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for key rotation of an encryption key, comprising:
    generating a first ciphertext by encrypting a plaintext with a homomorphic probabilistic encryption scheme based on a first key;
    generating an updating token based on a difference between the homomorphic probabilistic encryption scheme based on the first key and a homomorphic probabilistic encryption scheme based on a second key;
    generating a second ciphertext by encrypting the first ciphertext with the updating token;
    selecting a set of second ciphertext blocks from the second ciphertext;
    reverting the set of second ciphertext blocks with the updating token to a set of third ciphertext blocks; and
    computing a Hamming distance between blocks of the set of second ciphertext blocks and corresponding blocks of the set of third ciphertext blocks.

2. The method of claim 1, further comprising:
    in response to determining the Hamming distance is less than a threshold, validating the second ciphertext; and
    replacing the first key with the second key as the encryption key for the plaintext.

3. The method of claim 1, further comprising:
    in response to determining the Hamming distance is greater than a threshold, rejecting the second ciphertext; and
    retaining the first key as the encryption key for the plaintext.

4. The method of claim 3, further comprising:
    generating a second updating token based on a difference between the homomorphic probabilistic encryption scheme based on the first key and the homomorphic probabilistic encryption scheme based on a fourth key; and
    generating a fourth ciphertext by encrypting the first ciphertext with the second updating token.

5. The method of claim 1, wherein the set of third ciphertext blocks corresponds to a set of blocks selected from the first ciphertext.

6. The method of claim 1, wherein the homomorphic probabilistic encryption scheme is derived from a key-homomorphic pseudorandom function family.

7. The method of claim 1, wherein the homomorphic probabilistic encryption scheme is derived from a bi-homomorphic pseudorandom function family.

8. A method for verifiable key rotation of an encryption key, comprising:
    generating a first ciphertext by encrypting a plaintext with a homomorphic probabilistic encryption scheme based on a first key, wherein the first key is the encryption key;
    generating an updating token based on a difference between the homomorphic probabilistic encryption scheme based on the first key and a homomorphic probabilistic encryption scheme based on a second key;
    generating a second ciphertext by encrypting the first ciphertext with the updating token;
    selecting a set of second ciphertext blocks from the second ciphertext;
    reverting the set of second ciphertext blocks with the updating token to a set of third ciphertext blocks;
    computing a Hamming distance between blocks of the set of second ciphertext blocks and corresponding blocks of the set of third ciphertext blocks;
    in response to determining the Hamming distance is less than a threshold, validating the second ciphertext; and
    replacing the first key with the second key as the encryption key for the plaintext.

9. The method of claim 8, wherein the set of third ciphertext blocks corresponds to a set of blocks selected from the first ciphertext.

10. The method of claim 8, wherein the homomorphic probabilistic encryption scheme is derived from a key-homomorphic pseudorandom function family.

11. The method of claim 8, wherein the homomorphic probabilistic encryption scheme is derived from a bi-homomorphic pseudorandom function family.

12. A processing system, comprising: a memory comprising computer-executable instructions; and a processor configured to execute the computer-executable instructions and cause the processing system to:
    generate a first ciphertext by encrypting a plaintext with a homomorphic probabilistic encryption scheme based on a first key;
    generate an updating token based on a difference between the homomorphic probabilistic encryption scheme based on the first key and a homomorphic probabilistic encryption scheme based on a second key; and
    generate a second ciphertext by encrypting the first ciphertext with the updating token;
    select a set of second ciphertext blocks from the second ciphertext;
    revert the set of second ciphertext blocks with the updating token to a set of third ciphertext blocks; and
    compute a Hamming distance between blocks of the set of second ciphertext blocks and corresponding blocks of the set of third ciphertext blocks.

13. The processing system of claim 12, wherein the processor is further configured to:
    in response to determining the Hamming distance is less than a threshold, validate the second ciphertext; and
    replace the first key with the second key as an encryption key for the plaintext.

14. The processing system of claim 12, wherein the processor is further configured to:

in response to determining the Hamming distance is greater than a threshold, reject the second ciphertext; and retain the first key as an encryption key for the plaintext.

* * * * *